United States Patent

[11] 3,595,495

| [72] | Inventor | Peter Cloeren<br>Hayward, Calif. |
|---|---|---|
| [21] | Appl. No. | 807,762 |
| [22] | Filed | Mar. 17, 1969 |
| [45] | Patented | July 27, 1971 |
| [73] | Assignee | Guardian Packaging Corporation<br>Newark, Calif. |

[54] EDDY CURRENT CLUTCH ACTUATED REWINDER
1 Claim, 2 Drawing Figs.

| [52] | U.S. Cl. | 242/75.51 |
|---|---|---|
| [51] | Int. Cl. | B65h 51/30,<br>B65h 59/38 |
| [50] | Field of Search | 242/75.51,<br>75.5, 45 |

[56] References Cited
UNITED STATES PATENTS

| 2,392,148 | 1/1946 | Hornbostel | 242/65 |
|---|---|---|---|
| 2,819,512 | 1/1958 | Reeder | 242/75.5 X |
| 3,015,871 | 1/1962 | Noe | 242/75.5 X |
| 3,471,099 | 10/1969 | Albert | 242/75.51 |

*Primary Examiner*—George F. Mautz
*Attorney*—Townsend and Townsend

ABSTRACT: A web processing machine is provided with a single-variable speed motor as a source of power. The motor through connected gearing provides power outputs to a web metering feed section and a web rewind section which respectively feed and wind the continuously advancing web. An eddy current coupling between the metering feed section and rewind section is connected to a voltage source which provides excitation to the eddy current coupling coil. The eddy current coupling provides an adjustable horsepower output which is directly proportional to the speed of the advancing web. The torque output of the eddy current coupling is directly proportional to the difference in speed of the coupling's rotation input and output members. The above arrangement provides uniform web tension at all speeds of the web processing machine.

PATENTED JUL 27 1971 3,595,495

INVENTOR.
PETER CLOEREN
BY Townsend and Townsend
ATTORNEYS

EDDY CURRENT CLUTCH ACTUATED REWINDER

This invention relates to rewinders for placing an advancing web in a convolute wind about a rewind roll or core.

Rewinders generally function to wind an advancing web about a rewind roll. Tension is maintained to assure uniformity of the convolutely wound web. If the tension is too small, the convolutely wound web will tend to telescope on its core. Alternately, if the tension is too great, the rewound roll will star or fold about the core producing an uneven wind and a web which discharges a nonuniform tension and speed when it is subsequently unwound from its convolute wind on the core. In practice, it has been found desirable to maintain uniform web tension within very narrow limits.

Heretofore, rewinders have included elaborate apparatuses for providing tension between the web metering feed section and the core about which the advancing web is wound. These apparatuses have generally comprised a first motor powering the metering feed section which passes the advancing web at a controlled rate of speed. Commonly, a second motor powers the core and controls the web tension between the meter section and rewind roll. This second motor is either controlled in its horsepower output to provide constant web tension or alternately has an electrical or mechanical coupling between the motor and core which releases only the required amount of horsepower to provide the desired web tension.

These dual-motor driven apparatuses have serious disadvantages. First, the web tension between the metering feed section and the rewind roll is commonly variable within a relatively narrow range. Secondly, the maximum diameter wind which the rewind roll can accept has been limited to approximately 15 times the diameter of the core on which the web is wound. Additionally, these prior art machines have included large rotating masses and web tension sensors, which masses and sensors have inertia which causes tension variations when the speed of the advancing web is changed. Finally, these dual motor powered machines have all included elaborate control mechanisms which frequently hunt in attempting to provide the required tension and consequently produce a nonuniform tension of the web as fed to the rewind roll.

An object of this invention is to provide a rewinder which produces substantially uniform web tension. A web processing machine is provided with a single-variable speed motor as a source of power. The motor through connected gearing provides power outputs to a web metering feed section and a web rewind section which respectively feed and wind the continuously advancing web. An eddy current coupling between the metering feed section and rewind section is connected to a voltage source which provides excitation to the eddy current coupling coil. The eddy current coupling provides an adjustable horsepower output which is directly proportional to the speed of the advancing web. The torque output of the eddy current coupling is directly proportional to the difference in speed of the coupling's rotation input and output members and provides substantially constant tension on the advancing web.

A further object of this invention is to provide a rewinder which can be adjusted to provide infinite tension variation between the metering feed section and rewind roll.

A still further object of this invention is to provide a drive for the rewind roll which will permit the web to be wound to a diameter up to 50 times the initial and unwound diameter of the core.

A further object of this invention is to provide a rewinder which has minimum momentum in its rotating and moving parts.

An advantage of this invention is that it eliminates the need for web tension sensing apparatuses such as dancer rolls, transducers, and the like.

A further advantage of this invention is that it eliminates the complex controls required for driving the paired motors heretofore used in rewinders.

Other objects, features and advantages of this invention will become apparent as the following specification progresses, reference being made to the accompanying drawing for an illustration of a preferred embodiment of the present invention.

Figure 1:
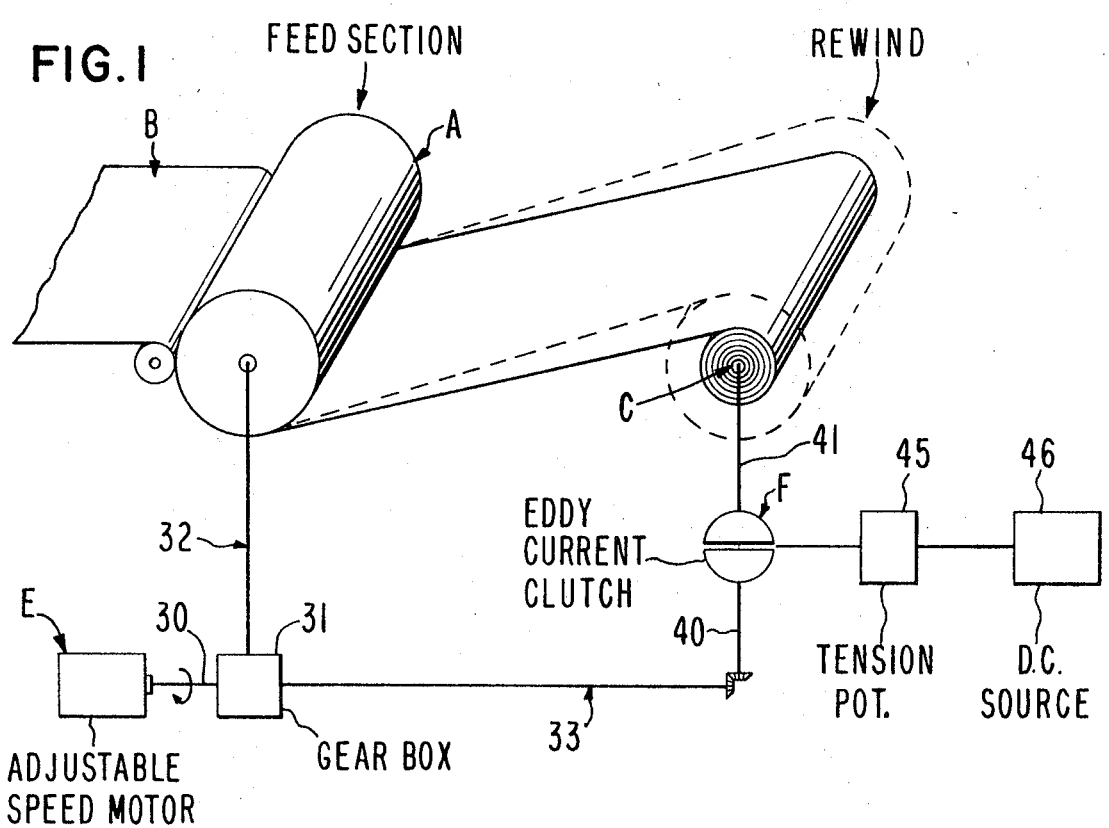
FIG. 1 is a schematic of the rewinder of this invention.

With reference to FIG. 1 the elements of the rewinder of this invention are schematically illustrated. Typically, a metering feed section A receives an advancing web B and releases this web at a preselected rate of speed to rewind roll C. The web passes from metering feed section A to rewind roll C where it is convolutely wound about the core.

Metering feed section A can be virtually any apparatus for pulling the web through the web processing machine and releasing web B at a controlled rate of speed. As here shown, the section comprises a large rotating drum which receives power and a second smaller roll which presses the passing web onto the drum so that the rotational power of the large drum is transferred to the web.

Web B includes any advancing strip of material. Accordingly, as used in this disclosure, web will be understood to include sheets, strips, strands of fabric, filaments, tubing, paneling, paper, plastic, synthetic material, metal and any laminate which includes the foregoing.

Rewind roll C includes any apparatus for taking up web B at a constant, predetermined rate. Typically, rewind roll C will include a core onto which the web is wound and the apparatus which initially grips the core, rotates the core when winding is taking place, and releases the wound core. As apparatuses are known which function to achieve all of the foregoing, they will not be discussed further.

Alternately, rewind roll C could be replaced by a draw metering section which functions to take up web B at a rate of speed greater than that speed at which metering feed section A releases web B. Such draw metering sections are used when it is desired to stretch web B to a reduced dimension.

Metering feed section A and rewind roll C are both powered from a single-variable speed motor E. Motor E has an output shaft 30 which connects to a gearbox 31. Gearbox 31 has two rotating shaft outlets. Rotating shaft 32 drives metering feed section A. Rotating shaft 33, through mechanical linkages such as the gears illustrated, drives rewind roll C. Shafts 30, 32 and 33 are rotated in a fixed and directly proportional speed relationship typically by meshed gears interior of box 31. The gearbox functions to transmit a portion of the power output of motor E to rewind roll C and the remaining portion of the power output of motor E to metering feed section A.

An eddy current coupling F is placed between rewind roll C and gearbox 31. This eddy current coupling, interrupting shaft 33 between gearbox 31 and rewind roll C, provides a horsepower output of variable speed motor E to the rewind roll C directly proportional to the line speed of the advancing web.

The function of the eddy current coupling F can best be understood when the horsepower and torque requirements of rewind roll C are analyzed.

It will be readily observed that when web B is first wound about rewind roll C, the core must be rotated rapidly to receive advancing web B at a constant lineal rate. Further, in order to exert a constant tension on the advancing web B, it will be observed that rewind roll C must have relatively less torque transmitted thereto since the lever arm between the point where the web contacts the core and the axis of core rotation is relatively short.

Conversely, it will be readily observed that when the rewind roll is almost fully wound, the core must be rotated only relatively slowly to receive advancing web B at a constant lineal rate. However, due to the length of the lever arm between the axis of rewind roll rotation and the point where the web is wound to the roll, the torque exerted by the rewind roll C must be relatively large. The torque and speed variation required throughout the winding of the core is provided by eddy current coupling F.

Figure 2:
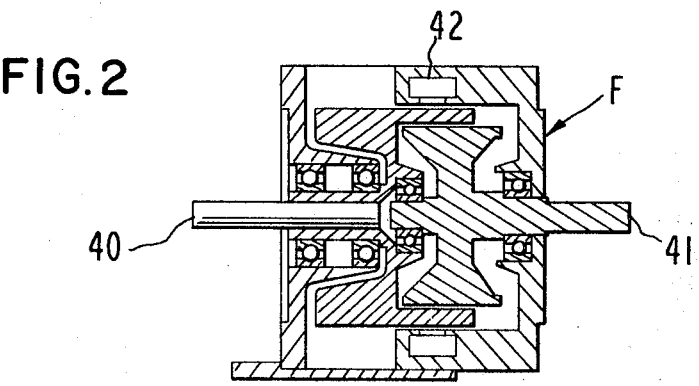
FIG. 2 is a cross section of an eddy current coupling suitable for use with the apparatus of this invention.

Referring to FIG. 2, a cross-sectional view of the eddy current coupling is illustrated. Typically, a rotating input member 40 linked by gears to gearbox 31 provides the rotation input into the coupling. A revolving output member 41 linked by gears directly to rewind roll C provides the output for the coupling. A field winding 42 generates an eddy current field between the input member 40 and output member 41 providing the desired eddy current coupling.

Typically, winding 42 is actuated by a potentiometer 45 providing an adjustable and constant current from an electrical current source 46. When winding 42 is energized, it creates in rotating input member 40 an eddy current field. Input member 40 when it rotates entrains output member 41 to follow this rotation by the force of its eddy current field. By the expedient of adjusting the excitation of winding 42, the coupling of the eddy current field between the input member and the output member can be controlled.

The function of the rewinder of this invention is a result of the eddy current coupling dividing out from the power output of adjustable speed motor E a horsepower output which is directly proportional to the speed of the web. It is characteristic of the illustrated eddy current coupling that so long as the current to field winding 42 is constant, the power transmitted through the coupling to output member 41 will remain, within design limits, proportional to the speed of input member 40. Torque transmission through the coupling, however, will vary. This variation will be directly proportional to the difference in relative speed of the coupling rotating members 40 and 41.

The speed of input member 40, however, is directly proportional to the speed of advancing web B. Input member 40 is mechanically linked through enmeshed gears including gearbox 31 to a speed which is proportional to the speed of shaft 32 to feed section A. Feed section A in turn rotates directly proportional to the speed of the advancing web B.

In operation of the rewinder, web B will first be threaded through the machine and fastened to the core of the rewind roll C. Thereafter, adjustable speed motor E will be started and commence to move the web through that portion of the web processing machine downstream of FIG. 1 through said section A to the rewind roll C. Feed section A will provide the force necessary to pull the web through the machine up to the feed section. The eddy current coupling, however, will divide out from the horsepower output of adjustable speed motor E a horsepower to rewind roll C which is directly proportional to the speed of the web. This will result from the fact that the speed of input member 40 of eddy coupling F is directly proportional to the speed of the advancing web.

As the machine increases in speed, the eddy current coupling will provide increasing horsepower to rewind roll C at a ratio directly proportional to the speed of the advancing web B.

Gears 31 transmit the power from variable speed motor E to two sources. These sources are the metering feed section A through shaft 32 and rewind roll C through shaft 33. The power output of motor E which is not transmitted to one shaft, will because of the one gear linkage, be transmitted to the remaining gear shaft.

Assuming that the rewinder is operating at constant line speed of web B and the horsepower output of the eddy current coupling F is directly proportional to the speed of the web, the horsepower transmitted to rewind core C will remain unchanged.

Eddy current coupling F, even though it receives constant horsepower, will transmit to rewind roll C variable torque. This torque will be directly proportional to the speed difference between input member 40 and output member 41. When rewind roll C is first wound, the speed difference between the input and output members 40 and 41 respectively will be small and consequently the torque transmitted through the coupling will be small. Conversely, when rewind roll C is finally wound, the speed difference between the input and output members 40 and 41 respectively will be large and the torque transmitted to the rewind roll will be correspondingly large.

It is important to note the speed of the output member 41 will be dependent upon the diameter of the wind of web B on rewind roll C. Hence, the torque transmitted through the coupling will vary independently of the line speed of the advancing web B and only as a function of the diameter of the wind on the core of the rewind roll C which in turn produces the variation in relative speed between input and output members 40 and 41 respectively.

It will also be observed that by increasing or decreasing the power transmitted to field winding 42 of the eddy current coupling, the tension on the advancing web B can be varied through virtually an unlimited range. Where relatively large web tension is desired, field winding 42 will be given a relatively large current flow and a relatively large horsepower output from motor E will be transmitted through coupling F. This will produce relatively large tension between web metering section A and rewind roll C. Conversely, when only slight tension is desired on web B, the current to field winding coil 42 of coupling F will be reduced. This will transfer only a small horsepower output from variable speed motor E to rewind roll C producing only slight tension in web B.

It is preferred to the practice of this invention that an electrical eddy current coupling of the type shown be used as no mechanical couplings are now known which have the speed and torque capabilities herein described.

It has been found that in order to enable the rewind roll to receive a convolutely wound web up to 50 times the diameter of the core, the speed of the shaft and gears driving the rewind reel should be approximately 10 percent in excess of the speed of the shaft powering the metering feed section. This excess speed permits the relatively small rewind roll to move at higher speed when the web is first being wound thereon.

It is already known that in order to produce convolute rolls which are wound uniformly, it is often desirable to have the web tension decrease gradually as the convolute wind on a core progresses from an initially wound state to a completely wound state. The higher tension, when the core is first wound, provides a firm base about the core on which the latter layers can be built. The decreased tension, when the core is finally wound, prevents the phenomenon known as "starring" from occurring due to the compression of the outermost layers of the convolute wind bearing down about the core.

It has been found that the eddy current coupling inherently provides the uniform reduction in tension as the rewind roll is wound. When the coupling is operated with a minimum difference between input and output shaft speed, as when the rewind is first being wound with the web it provides an increased torque which gives the web a tight wind about the rewind roll. Conversely, the inherent inefficiencies of the coupling ease the tension on the web as the roll becomes fully wound and the coupling functions to greatly reduce the rotational speed of the rewind roll. This easing of tension produces a superior wind of the web without additional controls of any sort.

Either metering feed section A or rewind roll C can consist of one or more units. For example, two metering feed sections A could feed simultaneously two webs for winding about a single rewind roll C. Conversely, two rewind rolls C could function to divide a single web B passing through a single metering feed section A.

I claim:

1. In a web processing machine for taking an advancing web and transferring said web to a convolute wind about a rewind roll on a rewinder wherein said rewinder includes, rewind roll drive means for rotating said rewind roll to receive said advancing web in a convolute wind, rotating web metering means upstream of said advancing web from said rewind roll for advancing said web under power as said web passes to said rewind roll, and means for driving said rewind roll drive means and said web metering means, the improvements in said means for driving including; a single-variable speed motor means having a rotating shaft for powering said web metering means and said rewind roll drive means; eddy current coupling means having an input shaft and an output shaft; transmission means linking said shaft of said motor, said input of said coupling and said rotating web metering means to rotate at a speed proportional to the speed of said driving means; and said rewind roll drive means directly coupled to the output of said eddy current coupling means to transmit power and torque from the output of said coupling at an identical rotational speed.